W. S. HADAWAY, Jr.
HEATING APPARATUS.
APPLICATION FILED AUG. 7, 1920.
1,383,110.
Patented June 28, 1921.
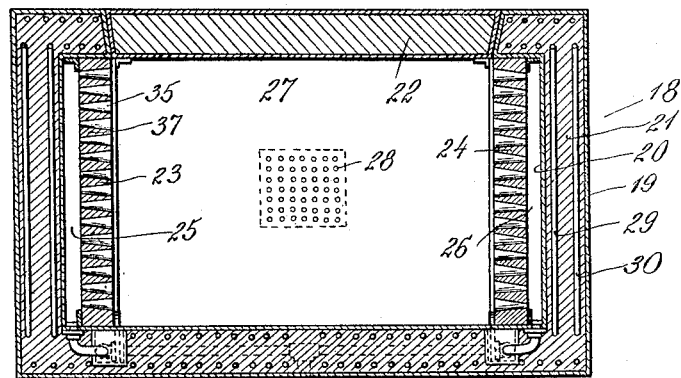
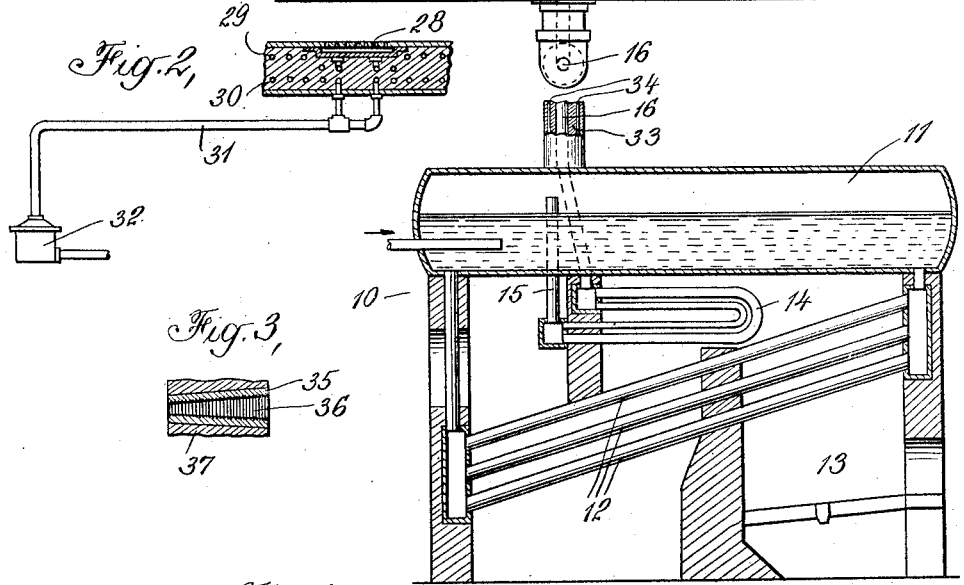
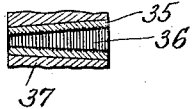
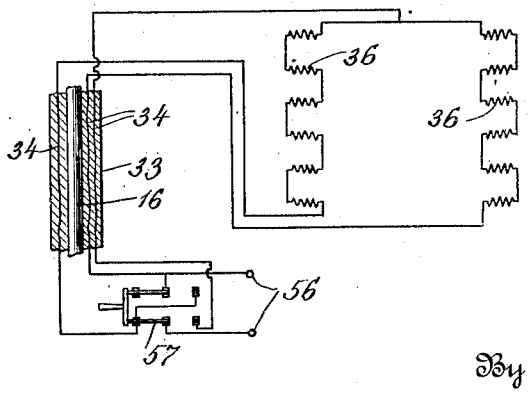
Inventor
William S. Hadaway Jr.
By his Attorney
E. W. Marshall

UNITED STATES PATENT OFFICE.

WILLIAM S. HADAWAY, JR., OF NEW ROCHELLE, NEW YORK.

HEATING APPARATUS.

1,383,110.   Specification of Letters Patent.   Patented June 28, 1921.

Original application filed November 15, 1919, Serial No. 338,328. Divided and this application filed August 7, 1920. Serial No. 401,898.

*To all whom it may concern:*

Be it known that I, WILLIAM S. HADAWAY, Jr., a citizen of the United States, and a resident of New Rochelle, Westchester county, and State of New York, have invented certain new and useful Improvements in Heating Apparatus, of which the following is a specification, reference being had to the accompanying drawings, forming a part thereof.

My invention relates to heating apparatus and has special reference to devices which require large quantities of relatively high temperature heat, such as, for example, japanning ovens or ovens for cooking and baking.

In my copending application Serial No. 42934, filed July 31, 1915, I have shown heating apparatus which is adapted to utilize low pressure steam for example, to provide a relatively large quantity of low temperature heat and electricity to supplement the low pressure steam, and to provide a relatively small quantity of high temperature heat. The electric energy is utilized to superheat the steam and the temperature of the heat produced by the steam constitutes a working level from which the electric energy operates.

There are many devices in commercial use which require instead of a large quantity of low temperature heat and a smaller quantity of high temperature heat, a relatively large quantity of high temperature heat. For example, ordinary ovens for cooking and baking require a temperature of about 400 degrees upward with relatively small fluctuations, or adjustments, depending on the nature of the work to be performed. Japanning ovens such as are largely used in commercial manufacturing processes constitute a very good example of apparatus which consumes high temperature heat in large quantities with a relatively small temperature variation required, say, from 450 to 550 degrees.

If steam or some other relatively inexpensive source of heat is employed for purposes of this kind, as a means for providing a working level, there is still a very large quantity of heat energy to be supplied provided the working level of the steam heat is about 220 degrees, corresponding to the temperature of saturated steam.

According to my present invention, I utilize a combustion steam generator and superheater as a means for elevating the working level to approximately the minimum temperature required of the apparatus, say, for example, 400 or 450 degrees, and utilize electric energy at the apparatus for regulating and boosting the temperature of the steam which has already been superheated.

One object of my invention is to provide a relatively high temperature heating apparatus adapted to receive a large proportion of the high temperature heat required from an inexpensive source, and to utilize a small proportion of electric energy for boosting and regulating the temperature of the heat thus provided.

Another object is to provide an electric heater adapted to raise the temperature of superheated steam.

Another object is to provide a heating system embodying a steam generator, a superheater associated therewith, heating apparatus adapted to receive the superheated steam from the generator, and electro-responsive means for boosting and regulating the temperature of the superheated steam at the heating apparatus.

Other objects of my invention will be set forth hereinafter, and in order that my invention may be thoroughly understood, I will now proceed to describe the same in the following specification, and then point out the novel features thereof in appended claims.

Referring to the drawings:

Figure 1 is a partially diagrammatic view of a heating plant or system showing a steam generator and superheater in sectional elevation, and an oven in sectional plan view which receives its energy partly from the superheated steam and partly from an electric circuit.

Fig. 2 is a sectional elevation of certain parts of the oven which is shown in Fig. 1.

Fig. 3 is a sectional detail of one of the electric heaters for boosting the temperature of the steam shown on a larger scale.

A diagram illustrating the circuit connections for one arrangement of the oven heaters, is shown in Fig. 4.

Like characters of reference designate corresponding parts in all of the figures of the drawings.

10 designates a steam generator of which 11 is the steam drum, 12 water tubes, 13 the fire pot and 14 the superheater coil. The steam generated in the steam drum 11 flows through pipe 15 into the superheater coil 14, and is discharged through a pipe 16 which is connected to an oven 18.

The oven comprises an outer shell 19 and an inner shell 20 with heat insulation 21 between them, a door 22 and a pair of electric heaters 23—24 which provide the steam chambers 25—26 and are adapted to boost the temperature of the steam as it flows from the steam chambers through the heater structure, as hereinafter explained, and into the oven chamber 27.

The supply pipe 16 is connected to the steam chambers 25—26, and the oven chamber is provided with an outlet 28 from which the steam is discharged into pipe coils 29 and 30. The coils 29 are disposed in the insulation 21 close to the inner shell 20 of the oven, while the coils 30 are disposed in the insulation close to the outer shell 19 of the oven. The steam after flowing through the coils 29 enters the coils 30 and is finally discharged through outlet pipe 31 to a steam trap which is indicated at 32.

The pipe 16 which conducts the superheated steam from the generator to the oven is thoroughly protected by insulation 33. Preferably disposed in this insulation are electric conducting wires 34 which may be of sufficiently high resistance to generate heat in the insulation and prevent a drop in temperature from the steam generator to the oven. The conductor for the superheated steam including the electrically heated insulation, may be suitably formed in accordance with my copending application Serial No. 67,147, filed December 16, 1915.

The electric heaters 23—24 may, of course, be formed in any suitable manner, but those shown and described possess many advantages for this service. The structure of Fig. 1 comprises a plurality of resistor tubes 35 within which are wound resistance wires or ribbons 36. The tube itself is formed of insulating material and a large number of them are employed. They are set into slabs such as 37 of some suitable substance like fire-clay, so that the heater when completed, has a large heat capacity, and provides a plurality of tapering steam passages in which high temperature electric heat is available for raising the temperature of the superheated steam as it passes.

The temperature of the steam discharged into the oven is very high and for many classes of work will do no damage, but in case it is not desired to have the steam come in contact with the articles or substance being heated, or cooked, an inner shell or box to receive such articles or substances may be provided. Such an arrangement is shown in Fig. 7 of application Serial No. 82,067 filed March 4, 1916, and refiled as Serial No. 338,328, November 15, 1919, from which application this case is divided.

The heater units 36 may be connected in series relation as shown in Fig. 4 or in some other suitable arrangement. 56 indicates an electrical source of energy, 57 a heat control switch for connecting the units in series or in two parallel groups if desired. The heater conductors 34 are connected to suitable switch posts and the line conductor 56 to the terminals of the same switch.

Various modifications may be effected within the spirit and scope of my invention, and I intend that only such limitations be imposed as are indicated in the appended claims.

What I claim is:

1. A heating system comprising a steam generator, a combination superheater, a working member and electro-responsive means for boosting the temperature of the steam at the working member.

2. A heating system comprising a steam generator, a superheater coil receiving its heat from the generator, a working member, means for conducting the superheated steam to the working member and for boosting the temperature of the steam.

3. A heating system comprising a steam generator, a superheater coil associated therewith, a working member, means for conducting superheated steam to the working member, and an electric heater associated with the working member for boosting the temperature of the superheated steam.

4. A heating system comprising a steam generator, a superheater coil associated therewith, a working member, means for conducting the superheated steam to the working member and maintaining the temperature thereof and an electric heater at the working member for boosting and regulating the temperature of the superheated steam at the point of use.

5. A heating system comprising a combustion steam generator, a superheater coil associated therewith and receiving its heat from the generator, a heat chamber, transmission means therein for passing the superheated steam into the chamber and increasing the temperature thereof as it is admitted.

6. A heating system comprising a steam generator, a superheater associated therewith, a heating chamber, auxiliary heating means within the chamber arranged to divide off a vapor compartment and to admit steam from the vapor compartment to the chamber, and means for conducting steam from the superheater to the vapor compartment.

7. A heating system comprising a steam generator, a superheater associated therewith, a heating chamber, and an electrically heated body adapted to deliver the steam to the chamber whereby the superheated steam is increased in temperature as it is delivered to the chamber.

8. A heating system comprising a steam generator, a superheater associated therewith, a heating chamber, and an electrically heated pervious body dividing off a vapor compartment within the chamber, adapted to deliver the steam to the chamber whereby the superheated steam is increased in temperature as it is delivered to the chamber.

9. A heating system comprising a steam generator, a superheater coil associated therewith, a working member, means for conducting the superheated steam to the working member and maintaining the temperature thereof, an electric heater at the working member for boosting and regulating the temperature of the superheated steam at the point of use, and means for supplying different desired amounts of electrical energy to said heater.

In witness whereof, I have hereunto set my hand this 28th day of July, 1920.

WILLIAM S. HADAWAY, Jr.